(12) United States Patent
Xu

(10) Patent No.: US 12,430,240 B2
(45) Date of Patent: Sep. 30, 2025

(54) METHOD AND APPARATUS FOR DETERMINING DATA STORAGE BIT WIDTH, AND METHOD FOR STORING INDEX DATA

(71) Applicant: CALTERAH SEMICONDUCTOR TECHNOLOGY (SHANGHAI) CO., LTD., Shanghai (CN)

(72) Inventor: Qi Xu, Shanghai (CN)

(73) Assignee: CALTERAH SEMICONDUCTOR TECHNOLOGY (SHANGHAI) CO., LTD., Shanghai (CN)

( * ) Notice: Subject to any disclaimer, the term of this patent is extended or adjusted under 35 U.S.C. 154(b) by 10 days.

(21) Appl. No.: 18/399,586

(22) Filed: Dec. 28, 2023

(65) Prior Publication Data

US 2024/0126683 A1 Apr. 18, 2024

Related U.S. Application Data

(63) Continuation of application No. PCT/CN2022/140793, filed on Dec. 21, 2022.

(30) Foreign Application Priority Data

Jun. 16, 2022 (CN) .......................... 202210681153.1

(51) Int. Cl.
*G06F 12/00* (2006.01)
*G06F 12/02* (2006.01)
(52) U.S. Cl.
CPC ................................. *G06F 12/023* (2013.01)
(58) Field of Classification Search
CPC ......... G06F 12/023; G06F 12/04; G06F 12/06
See application file for complete search history.

(56) References Cited

U.S. PATENT DOCUMENTS

2003/0140078 A1 7/2003 Feuser
2011/0099295 A1* 4/2011 Wegener ................. H03M 7/46
711/170

(Continued)

FOREIGN PATENT DOCUMENTS

CN 109977348 A 7/2019
CN 110267049 A 9/2019

(Continued)

OTHER PUBLICATIONS

EP Search Report for EP Application No. 22863689.0, dated Oct. 24, 2024.

(Continued)

*Primary Examiner* — Shawn X Gu
(74) *Attorney, Agent, or Firm* — Foley & Lardner LLP

(57) ABSTRACT

A method and apparatus for determining a data storage bit width and a method for storing exponential data. The method for determining the data storage bit width includes: acquiring data to be stored, the number of which is at least 4; dividing the data into blocks according to a preset number $2^n$, n is an integer greater than or equal to 2; determining effective bit numbers and a value of a maximum effective bit number in a block; dividing data in the block equally into a first sub-block and a second sub-block, acquiring effective bit numbers in first and second sub-blocks; performing a differential calculation on effective bit numbers in first and second sub-blocks to obtain an effective differential value; determining a storage bit width for storing effective differential value according to a preset storage bit width interval to which the value of maximum effective bit number belongs.

19 Claims, 2 Drawing Sheets

(56) References Cited

U.S. PATENT DOCUMENTS

2012/0023149 A1 1/2012 Kinsman et al.
2021/0201134 A1 7/2021 Li et al.

FOREIGN PATENT DOCUMENTS

| CN | 111198673 A | 5/2020 |
| CN | 112905125 A | 6/2021 |
| CN | 114115740 A | 3/2022 |
| JP | 2004-078886 A | 3/2004 |

OTHER PUBLICATIONS

International Search Report and Written Opinion for PCT Application No. PCT/CN2022/140793 dated Feb. 10, 2023.
Zhang, Z., et al., "Storage Format of Floating-Point Number and its Bits of Decimal Significant Digits in C Language," Computer & Digital Engineering, No. 1, Jan. 20, 2006, pp. 84-86.

\* cited by examiner

METHOD AND APPARATUS FOR DETERMINING DATA STORAGE BIT WIDTH, AND METHOD FOR STORING INDEX DATA

CROSS-REFERENCE TO RELATED APPLICATION(S)

This application is a continuation of International PCT Application No. PCT/CN2022/140793 filed Dec. 21, 2022, which claims the priority to Chinese patent application No. 202210681153.1 filed on Jun. 16, 2022, which are hereby incorporated herein by reference in their entireties.

TECHNICAL FIELD

An embodiment of the present disclosure relates to, but is not limited to a technical field of data storage, in particular to a method and apparatus for determining a data storage bit width and a method for storing exponential data.

BACKGROUND

Data are stored in internal or external media of a computer in a certain format, and different numbers of bits are occupied during a storage process. Bit (binary digit) is the smallest unit of information stored in the computer, which is represented by 0 or 1.

When data is stored, it is usually stored in binary scientific notation based on IEEE 754 standard. For example, a decimal number 123.25390625 may be converted into a binary number $1.11101101000001*2^6$, wherein "6" represents an exponential portion of the data, which is also called an effective bit number. At present, the effective bit number is stored by being allocated bits according to its storage bit width occupied after its binarization.

However, due to the huge amount of data to be stored in computers, a larger storage bit width is occupied by adopting a way of currently storing effective bit numbers of data.

SUMMARY

The following is a summary of the subject matter described in detail herein. This summary is not intended to limit the scope of protection of the claims.

An embodiment of the present disclosure provides a method for determining a data storage bit width, which is used for solving the problem that a larger storage bit width is occupied by adopting a way of currently storing effective bit numbers of data.

In a first aspect, an embodiment of the present disclosure provides a method for determining a data storage bit width, including: acquiring data to be stored, wherein a number of the data is at least 4; dividing the data into blocks according to a preset number, and determining an effective bit number corresponding to each data in a block and a value of a maximum effective bit number in the block, wherein the preset number is equal to $2^n$, and n is an integer greater than or equal to 2; dividing data in the block into a first sub-block and a second sub-block with an equal number, and acquiring effective bit numbers contained in the first sub-block and effective bit numbers contained in the second sub-block; performing a differential calculation on the effective bit numbers contained in the first sub-block and the effective bit numbers contained in the second sub-block to obtain an effective differential value; and determining a storage bit width for storing the effective differential value according to a preset storage bit width interval to which the value of the maximum effective bit number belongs.

Alternatively, the performing the differential calculation on the effective bit numbers contained in the first sub-block and the effective bit numbers contained in the second sub-block to obtain the effective bit differential value includes: performing a differential calculation on the effective bit numbers contained in the first sub-block and the effective bit numbers contained in the second sub-block to obtain an effective bit sub-block differential value between the first sub-block and the second sub-block; performing a differential calculation on the effective bit numbers contained in the first sub-block to obtain an effective bit differential value of the first sub-block; and performing a differential calculation on the effective bit numbers contained in the second sub-block to obtain an effective bit differential value of the second sub-block.

Alternatively, the performing the difference calculation on the effective bit numbers contained in the first sub-block and the effective bit numbers contained in the second sub-block to obtain the effective bit sub-block differential value of the first sub-block and the second sub-block includes: acquiring a value of a maximum effective bit number in the first sub-block and a value of a maximum effective bit number in the second sub-block; performing a subtraction operation on the value of the maximum effective bit number in the first sub-block and the value of the maximum effective bit number in the second sub-block to obtain the effective bit sub-block differential value.

Alternatively, the performing the differential calculation on the effective bit numbers contained in the first sub-block to obtain the effective bit differential value of the first sub-block includes: performing a subtraction operation on values of the effective bit numbers contained in the first sub-block to obtain the effective bit differential value of the first sub-block.

Alternatively, the performing the differential calculation on the effective bit numbers contained in the second sub-block to obtain the effective bit differential value of the second sub-block includes: Performing a subtraction on values of the effective bit numbers contained in the second sub-block to obtain the effective bit differential value of the second sub-block.

Alternatively, before the determining the storage bit width for storing the effective differential value according to the preset storage bit width interval to which the value of the maximum effective bit number belongs, the method further includes: performing a binarization on the value of the maximum effective bit number to determine a storage bit width for storing the maximum effective bit number.

Alternatively, the determining the storage bit width for storing the effective differential value according to the preset storage bit width interval to which the value of the maximum effective bit number belongs includes: determining a storage bit width for storing the effective bit sub-block differential value between the first sub-block and the second sub-block according to the preset storage bit width interval to which the value of the maximum effective bit number belongs; determining a storage bit width for storing the effective bit differential value of the first sub-block according to the preset storage bit width interval to which the value of the maximum effective bit number belongs; and determining a storage bit width for storing the effective bit differential value of the second sub-block according to the preset storage bit width interval to which the value of the maximum effective bit number belongs.

Alternatively, the determining the effective bit number corresponding to each data in the each block includes: when the data is a real number, determining that the effective bit number of the data is an effective bit number corresponding to the real number; or, when the data is a complex number, determining that the effective bit number of the data is a maximum effective bit number of a real number portion and an imaginary number portion of the complex number.

In a second aspect, an embodiment of the present disclosure provides an apparatus for determining a data storage bit width, including: an acquisition module, a block dividing module, a differential processing module and a determination module.

The acquisition module is configured to acquire data to be stored, wherein a number of data is at least 4.

The block dividing module is configured to divide the data into blocks according to a preset number, and determine an effective bit number corresponding to each data in a block and a value of a maximum effective bit number in the block, wherein the preset number is equal to $2^n$, and n is an integer greater than or equal to 2.

The block dividing module is further configured to divide data in the block into a first sub-block and a second sub-block with an equal number, and acquire effective bit numbers contained in the first sub-block and effective bit numbers contained in the second sub-block.

The differential processing module is configured to perform a differential calculation on the effective bit numbers contained in the first sub-block and the effective bit numbers contained in the second sub-block to obtain an effective differential value.

The determination module is configured to determine a storage bit width for storing the effective differential value according to a preset storage bit width interval to which the value of the maximum effective bit number belongs.

In a third aspect, an embodiment of the present disclosure provides a method for storing exponential data, wherein each data in the exponential data has a corresponding effective bit number, and the method may include: acquiring a maximum effective bit number $Em_a$ in the data for any data block containing four successive data in the exponential data; dividing the data block into two sub-data blocks equally, and acquiring a differential value $Esd_a$ of maximum effective bit numbers of the two sub-data blocks; acquiring an effective bit differential value $Ead_a$ of effective bit numbers in each sub-data block; and storing the maximum effective bit number $Em_a$, the effective bit sub-block differential value $Esd_a$, and the effective bit differential value $Ead_a$, to achieve storage of the data block.

Alternatively, when the exponential data contains eight successive data, the method further includes: acquiring a maximum effective bit number $Em_b$ in the eight data; dividing the exponential data into two data blocks equally, and acquiring an effective bit block differential value $Esd_b$ of maximum effective bit numbers in the two data blocks; acquiring an effective bit sub-block differential value $Esd_a$ of sub-data blocks and an effective bit differential value $Ead_a$ of each sub-data block; and storing the maximum effective bit number Ems, the effective bit block differential value $Esd_b$, the effective bit sub-block differential value $Esd_a$ and the effective bit differential value $Ead_a$, to achieve storage of the eight data.

Alternatively, when $4*2^x$ successive data are contained in the exponential data, X being an integer greater than or equal to 1, the method further includes: performing one or more bisection processings on the $4*2^x$ successive data to divide the $4*2^x$ successive data into a plurality of successive data blocks including a preset number of data; acquiring a maximum effective bit number Em in the successive $4*2^x$ data, an effective bit block differential value $Esd_b$ of maximum effective bit numbers of data blocks in each bisection processing, an effective bit sub-block differential value $Esd_a$ of sub-data blocks, and an effective bit differential value $Ead_a$ of each sub-data block; storing the maximum effective bit number Em in the successive $4*2^x$ data, the effective bit block differential value $Esd_b$ of maximum effective bit numbers of data blocks in each bisection processing, the effective bit sub-block differential value $Esd_a$ of sub-data blocks and the effective bit differential value $Ead_a$ of each sub-data block, to achieve storage of the $4*2^x$ exponential data;

wherein a total number of stored data is $4*2^x$.

In a fourth aspect, an embodiment of the present disclosure provides an electronic device including: at least one processor, a memory, a receiver and a transmitter.

The receiver and the transmitter are both coupled to the processor; the processor controls a receiving action of the receiver, and the processor controls the sending action of the transmitter.

The memory stores computer-executable instructions.

The at least one processor executes the computer-executable instructions stored in the memory to enable the electronic device to perform the method of any one of the first or third aspect.

In a fifth aspect, an embodiment of the present disclosure provides a computer-readable storage medium having computer-executable instructions stored thereon, when executed by a processor, the method of any one of the first aspect or the third aspect is performed.

In a sixth aspect, an embodiment of the present disclosure provides a computer program product including a computer program, when executed by a processor, the method of any one of the first aspect or the third aspect is performed.

According to the method and apparatus for determining the data storage bit width provided by embodiments of the present disclosure, the data to be stored are acquired, the data are divided into blocks according to the preset number, and the effective bit number corresponding to each data in a block and the value of the maximum effective bit number in the block are determined, wherein the preset number is equal to $2^n$, and n is an integer greater than or equal to 2. Then the data in the each block is equally divided into the first sub-block and the second sub-block with an equal number, effective bit numbers contained in the first sub-block and effective bit numbers contained in the second sub-block are acquired, and a differential calculation is performed on the effective bit numbers contained in the first sub-block and the effective bit numbers contained in the second sub-block to obtain an effective differential value. Finally, the storage bit width for storing the effective differential value is determined according to the preset storage bit width interval to which the value of the maximum effective bit number belongs. The embodiments of the present disclosure greatly reduce the storage bit width occupied by the data effective bit numbers by storing the differential values of the effective bit numbers of the data.

After the drawings and detailed description are read and understood, other aspects can be understood.

BRIEF DESCRIPTION OF THE DRAWINGS

The drawings herein which are incorporated into and constitute a portion of the specification illustrate embodiments consistent with the present disclosure, and are used to explain the principles of the present disclosure in conjunction with the specification.

Figure 1:
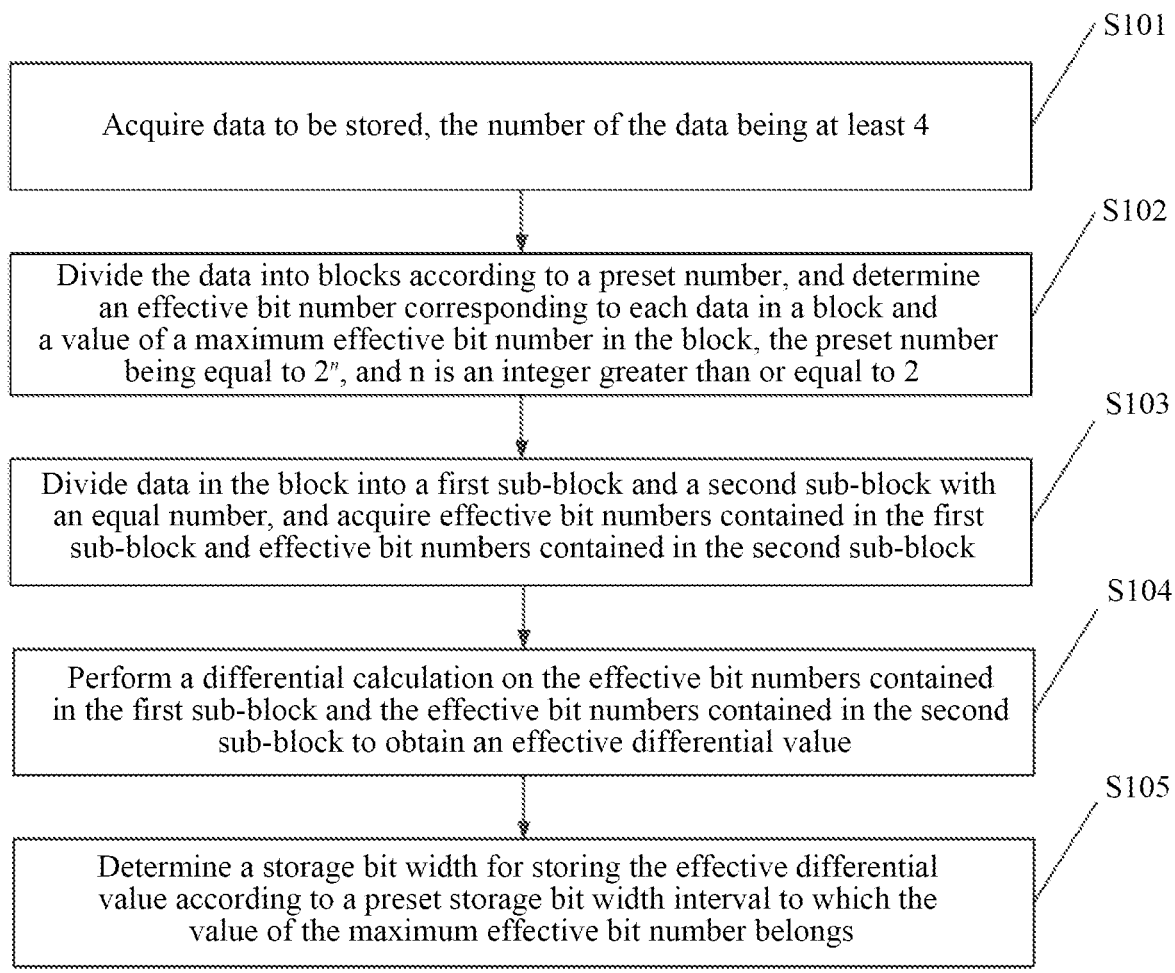
FIG. 1 is a schematic flowchart of a method for determining a data storage bit width provided by an embodiment of the present disclosure.

Explicit embodiments of the present disclosure have been shown by the above drawings, and will be described in more detail below. These drawings and descriptions are not intended to limit the scope of the concept of the present disclosure in any way but to illustrate the concepts of the disclosure for those skilled in the art by reference to specific embodiments.

DETAILED DESCRIPTION

Exemplary embodiments will be described in detail herein, and examples thereof are shown in the accompanying drawings. When the following description involves the accompanying drawings, unless otherwise indicated, the same number in different drawings indicates a same or similar element. The implementations described in following exemplary embodiments do not represent all implementations according to the present disclosure. Instead, they are merely examples of an apparatus and method according to some aspects of the present disclosure as detailed in the appended claims.

In the description of embodiments of the present disclosure, the terms such as "left", "right" indicating directional or positional relationships are based on the directional or positional relationships shown in tables or drawings, which is only for ease of description, rather than indicating or implying that the apparatus or member referred to must have a specific orientation, be constructed or operated in the specific orientation, and thus should not be understood as limitations to the present disclosure.

Data storage objects include temporary files generated during the processing of data streams or information that needs to be searched during processing, which are usually recorded in internal or external storage media of computers in a certain format. The data storage process will occupy a different number of bits (binary digits), which are also referred to as storage bit width in embodiments of the present disclosure, and is the smallest unit of information amount.

When data is stored, it is usually stored in a binary scientific notation based on IEEE 754 standard, the full name of which is Institute of Electrical and Electronics Engineers binary floating-point arithmetic standard, and it is also called a binary floating-point arithmetic of a microprocessor system. Data is stored based on the IEEE 754 standard in a format that one number is represented in triples (a sign bit, an exponential portion, a decimal portion). Herein, the sign bit is used to indicate positive or negative of the data, and the exponential portion and the decimal portion may be obtained by a binary conversion. For example, the decimal number 8.25 may be converted to the binary number $1.00001*2^3$, wherein "1.00001" represents the remainder portion of the data, "3" represents the exponential portion of the data, which is also called the effective bit number, and "00001" represents the decimal portion of the data.

After the data are converted into a form of binary scientific notation, the integers of the remainder portions are all 1, which need not be reflected in the memory, and only the binary "00001" after the decimal point needs to be stored in the memory, and a storage bit width needs to be allocated to the binary "00001" after the decimal point. Exemplarily, Table 1 shows a storage way of 32-bit data. As shown in Table 1, when the data 8.25 is stored, the most significant bit, that is, the leftmost bit, is the sign bit, which is used to represent the positive or negative of the data, the middle portion is the exponential bits, which are used to store the exponential portion, that is, an effective bit number portion, and the right portion is a decimal portion, which is used to store the decimal of the remainder portion.

TABLE 1

| 0 | 11 | 00001 |
|---|----|-------|

Embodiments of the present disclosure mainly illustrate a storage bit width occupied by the effective bit number portion of the data.

The effective bit number may be stored by being allocated bits according to its storage bit width occupied after its binarization. For example, if the effective bit numbers to be stored are 31, 30, 28 and 26 respectively, and then the effective bit numbers are respectively 11111, 11110, 11100 and 11100 after binarization, then storing these four effective bit numbers needs to occupy 20 bits. However, due to the huge amount of data to be stored in computers, the way of storing effective bit number of data occupies lager storage bit width.

Therefore, embodiments of the present disclosure provide a method and an apparatus for determining a data storage bit width, in which data to be stored may be divided into blocks according to a preset number, and an effective bit number corresponding to each data in a block and a value of a maximum effective bit number in the block are determined, then data in the each block is divided into a first sub-block and a second sub-block with an equal number, effective bit numbers contained in the first sub-block and effective bit numbers contained in the second sub-block are acquired, a differential calculation is performed on the effective bit numbers contained in the first sub-block and the effective bit numbers contained in the second sub-block to obtain an effective differential value, and finally, a storage bit width for storing the effective differential value is determined according to a preset storage bit width interval to which the value of the maximum effective bit number belongs. The embodiments of the present disclosure reduce the storage bit width occupied by the data effective bit numbers by storing the differential values of the effective bit numbers of the data.

Embodiments of the present disclosure may be applied to the storage of exponential portions of a plurality of types of data. For example, the data type may be numbers, words, symbols, graphics, audio, video, etc. It may be understood that the method for determining the data storage bit width provided by the embodiments of the present disclosure includes, but is not limited to, the storage of the above types of data, which thus are not considered as limitations to the embodiments of the present disclosure.

The technical solutions of the embodiments of the present disclosure and how to solve the above technical problems by the technical solutions of the embodiments of the present disclosure will be illustrated in detail through several embodiments. The following several embodiments may be combined with one another, and identical or similar concepts or processes therein may not be repeated in some embodiments. Embodiments of the present disclosure will be described below in conjunction with the drawings.

FIG. 1 is a schematic flowchart of a method for determining a data storage bit width provided by an embodiment of the present disclosure. As shown in FIG. 1, the method specifically includes the following acts.

In S101, data to be stored are acquired, the number of which is at least 4.

The executive body of the embodiments of the present disclosure may be a computer or another apparatus (such as a millimeter wave radar chip) or device capable of processing and storing data. The embodiment is illustrated by taking the computer as an example. When the computer is processing the data, no matter whether the input data is decimal or hexadecimal, it is finally converted into a binary scientific notation form for storage.

The method for determining the data storage bit width of the embodiment of the present disclosure is mainly used for storing an exponential portion of binary data, which is also referred to as an effective bit number portion. For example, the decimal data 8.25 is converted to a binary scientific notation form of $1.00001*2^3$, wherein "3" is the effective bit number portion.

In an embodiment of the present disclosure, the number of acquired data to be stored is at least 4.

In S102, the data is divided into blocks according to a preset number, and an effective bit number corresponding to each data in a block and a value of a maximum effective bit number in the block are determined, wherein the preset number is equal to $2^n$, and n is an integer greater than or equal to 2.

Exemplarily, when n is equal to 2, the preset number is 4, and the data are divided into blocks with every 4 data in one group. The effective bit numbers corresponding to the four data in each block are determined, meanwhile, the value Em (Effective bits max) of the maximum effective bit number among the four effective bit numbers is determined.

Taking n equal to 3 as an example, when n=3, the preset number is 8, and the data are divided into blocks with every 8 data in one group. The effective bit numbers corresponding to the 8 data in each block are determined, meanwhile, the value Em of the maximum effective bit number among the 8 effective bit numbers is determined.

In some exemplary embodiments, when the data is a real number, it is determined that the effective bit number of the data is an effective bit number corresponding to the real number.

When the data is a complex number, it is determined that the effective bit number of the data is a maximum effective bit number of a real number portion and an imaginary number portion of the complex number.

In S103, data in the each block are divided into a first sub-block and a second sub-block with an equal number, and effective bit numbers contained in the first sub-block and effective bit numbers contained in the second sub-block are acquired.

Exemplarily, still taking n equal to 2 as an example, the data in the block are equally divided with an equal number, that is, two data as a group, the data are divided into a first sub-block and a second sub-block, and then two effective bit numbers in the first sub-block and two effective bit numbers in the second sub-block are acquired.

In S104, a differential calculation is performed on the effective bit numbers contained in the first sub-block and the effective bit numbers contained in the second sub-block to obtain an effective differential value.

Herein, the effective bit differential value includes an effective bit sub-block differential value Esd (Effective bit subblock adjacent difference) between the first sub-block and the second sub-block, an effective bit differential value Ead[0] (Effective bit adjacent difference) of the first sub-block, and an effective bit differential value Ead[1] of the second sub-block.

In S105, a storage bit width for storing the effective differential value is determined according to a preset storage bit width interval to which the value of the maximum effective bit number belongs.

Since the value Em of the maximum effective bit number has been obtained in the S102, the storage bit width for storing the effective bit sub-block differential value Esd, the effective bit differential value Ead[0] of the first sub-block and the effective bit differential value Ead[1] of the second sub-block may be determined according to the preset memory bit width interval to which the value Em of the maximum effective bit number belongs.

In the above embodiment of the present disclosure, the data to be stored are acquired and divided into blocks according to the preset number, wherein the preset number is equal to $2^n$, and n is an integer greater than or equal to 2; the effective bit number corresponding to each data in a block and the value of the maximum effective bit number corresponding to each block are determined. Then the data in the each block is continued to be equally divided into the first sub-block and the second sub-block, meanwhile the effective bit numbers contained in the first sub-block and the effective bit numbers contained in the second sub-block are acquired, and a differential calculation is performed on the effective bit numbers contained in the first sub-block and the effective bit numbers contained in the second sub-block to obtain an effective differential value. Finally, the storage bit width for storing the effective differential value is determined according to the preset storage bit width interval to which the value of the maximum effective bit number belongs. The embodiment reduces the storage bit width occupied by the data effective bit numbers by storing the differential values of the effective bit numbers of the data.

Alternatively, on the basis of the above-mentioned embodiment, a specific process for performing a differential calculation on the effective bit numbers contained in the first sub-block and the effective bit numbers contained in the second sub-block to obtain the effective bit differential value will be illustrated with reference to FIG. 2.

Figure 2:
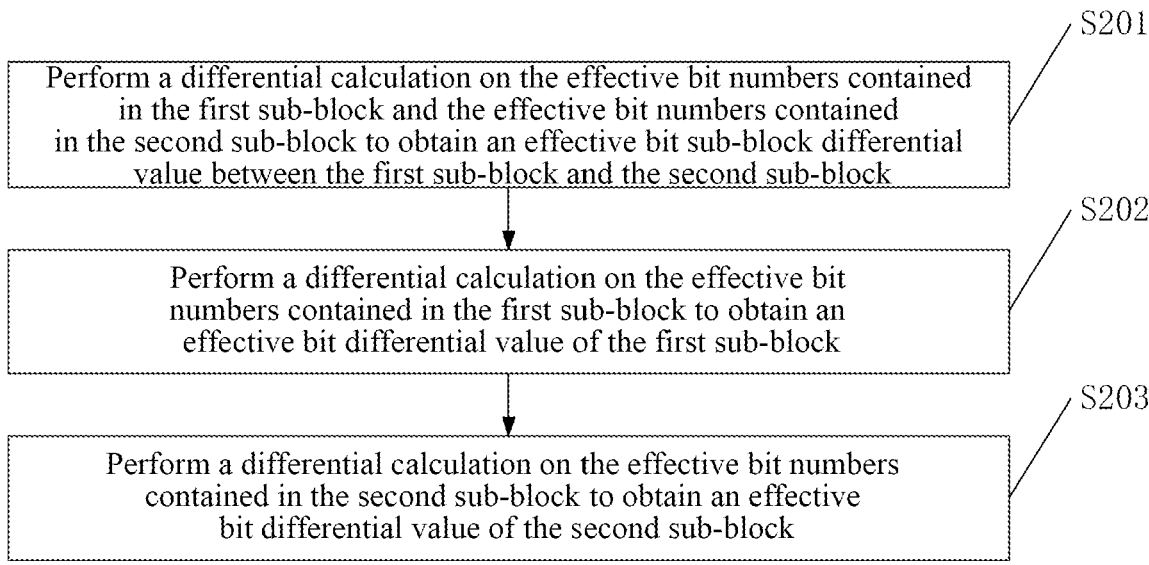
FIG. 2 is a schematic flowchart of a method for obtaining an effective bit differential value provided by an embodiment of the present disclosure.

FIG. 2 is a schematic flowchart of a method for obtaining an effective bit differential value provided by an embodiment of the present disclosure. As shown in FIG. 2, the method includes the following acts.

In S201, a differential calculation is performed on the effective bit numbers contained in the first sub-block and the effective bit numbers contained in the second sub-block to obtain an effective bit sub-block differential value between the first sub-block and the second sub-block.

Alternatively, the performing the difference calculation on the effective bit numbers contained in the first sub-block and the effective bit numbers contained in the second sub-block to obtain the effective bit sub-block differential value between the first sub-block and the second sub-block includes: acquiring a value of a maximum effective bit number in the first sub-block and a value of a maximum effective bit number in the second sub-block; and performing a subtraction operation on the value of the maximum effective bit number in the first sub-block and the value of the maximum effective bit number in the second sub-block to obtain the effective bit sub-block differential value Esd.

In S202, a differential calculation is performed on the effective bit numbers contained in the first sub-block to obtain an effective bit differential value of the first sub-block.

Alternatively, the performing the differential calculation on the effective bit numbers contained in the first sub-block to obtain the effective bit differential value of the first sub-block includes: performing a subtraction operation on values of effective bit numbers contained in the first sub-block to obtain the effective bit differential value Ead[0] of the first sub-block.

In S203, a differential calculation is performed on the effective bit numbers contained in the second sub-block to obtain an effective bit differential value of the second sub-block.

Alternatively, the performing the differential calculation on the effective bit numbers contained in the second sub-block to obtain the effective bit differential value of the second sub-block includes: performing a subtraction operation on values of effective bit numbers contained in the second sub-block to obtain the effective bit differential value Ead[1] of the second sub-block.

Alternatively, after the effective bit sub-block differential value Esd between the first sub-block and the second sub-block, the effective bit differential value Ead[0] of the first sub-block and the effective bit differential value Ead[1] of the second sub-block are obtained, the storage bit width for storing the effective differential value is determined according to the preset storage bit width interval to which the value Em of the maximum effective bit number belongs.

Before the above determination, a binarization is first performed on the value of the maximum effective bit number to determine a storage bit width for storing the maximum effective bit number. For example, if the value of the maximum effective bit number Em is equal to 31, Em after the binarization is 11111, which occupies a storage bit width of 5 bits.

Then, storage bit widths of the effective bit sub-block differential value Esd between the first sub-block and the second sub-block, the effective bit differential value Ead[0] of the first sub-block, the effective bit differential value Ead[1] the second sub-block are respectively determined according to the preset storage bit width interval to which the value Em of the maximum effective bit number belongs.

Alternatively, a storage bit width for storing the effective bit sub-block differential value between the first sub-block and the second sub-block may be determined according to the preset storage bit width interval to which the value of the maximum effective bit number belongs.

Exemplarily, illustration is made below by taking the effective bit number of 32-bit as an example.

When the value Em of the maximum effective bit number is in an interval [16, 31], the storage bit width of the effective bit sub-block differential value Esd between the first sub-block and the second sub-block is determined to be 6 bits.

When the value Em of the maximum effective bit number is in an interval [8, 15], the storage bit width of the effective bit sub-block differential value Esd between the first sub-block and the second sub-block is determined to be 5 bits.

When the value Em of the maximum effective bit number is in an interval [4, 7], the storage bit width of the effective bit sub-block differential value Esd between the first sub-block and the second sub-block is determined to be 4 bits.

When the value Em of the maximum effective bit number is in an interval [2, 3], the storage bit width of the effective bit sub-block differential value Esd between the first sub-block and the second sub-block is determined to be 3 bits.

In an embodiment of the present disclosure, the storage bit width of the effective bit sub-block differential value Esd is always larger than the storage bit width of the value Em of the maximum effective bit number by 1 bit, 1 bit may be reserved in the effective bit sub-block differential value Esd, which can be used to indicate the position of the value Em of the maximum effective bit number, that is, to indicate whether the value Em of the maximum effective bit number comes from the first sub-block or the second sub-block.

Alternatively, a storage bit width for storing the effective bit differential value of the first sub-block may be determined according to the preset storage bit width interval to which the value of the maximum effective bit number belongs.

A storage bit width for storing the effective bit differential value of the second sub-block may be determined according to the preset storage bit width interval to which the value of the maximum effective bit number belongs.

Exemplarily, when the value Em of the maximum effective bit number is in an interval [16, 31], the storage bit width for storing the effective bit differential value Ead[0] of the first sub-block and the storage bit width for storing the effective bit differential value Ead[1] of the second sub-block are determined to be 4 bits, respectively; and when the value Em of the maximum effective bit number is in an interval [2, 15], the storage bit width for storing the effective bit differential value Ead[0] of the first sub-block and the storage bit width for storing the effective bit differential value Ead[1] of the second sub-block are determined to be 3 bits, respectively.

Herein, a preset storage bit width interval of the effective bit sub-block differential value and a preset storage bit width interval of the effective bit differential value have been set in advance in a computer, and the computer can dynamically allocate Esd and Ead according to the value of the maximum effective bit number.

To sum up, after the differential calculation is performed on the effective bit numbers contained in the first sub-block and the effective bit numbers contained in the second sub-block, the effective bit sub-block differential value between the first sub-block and the second sub-block, the effective bit differential value of the first sub-block and the effective bit differential value of the second sub-block are obtained. Then, the storage bit widths for storing the above effective bit differential values are determined according to the preset storage bit width interval to which the value of the maximum effective bit number belongs.

The method for determining the data storage bit width provided by the embodiment of the present disclosure is also suitable for block division with the preset data number of 8, 16, or $2^n$ in addition to the preset data number of 4, wherein n is an integer greater than or equal to 2. When the data are divided into blocks with the data number of eight, the eight data are first divided into two blocks, each of which has four data, then each block is divided into two sub-blocks, the storage bit width of the effective bit numbers is determined according to the above method. The method for determining the storage bit width is not repeated here in detail.

Similarly, when the data are divided into blocks with the data number of 16, the 16 data are first divided into two blocks, each of which contains 8 data, then each block containing 8 data is divided into two blocks containing 4 data, then each block containing 4 data is divided into two sub-blocks, and the storage bit width of effective bit numbers is determined according to the above method. The method for determining the storage bit width is not repeated here in detail.

In the following, the method for determining the storage bit width will be illustrated in detail by way of an embodiment.

First, the effective bit numbers of a positive number, a negative number and real and imaginary number portion of a complex number are defined.

The effective bit number of the real portion of the complex number and the effective bit number of the positive number both refer to a length from the first non-0 number to the least significant bit, wherein the most significant bit represents the sign bit, "0" represents a positive number and "1" represents a negative number.

As shown in Table 2, the number represented in Table 2 is a positive number or a real portion of a complex number, and it can be seen that the effective bit number of the number is 14 according to the above definition.

TABLE 2

| 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 |

The effective bit number of the negative number and the effective bit number of the imaginary number portion of the complex number both refer to a length from the first non-1 number, starting from the most significant bit, to the least significant bit.

As shown in Table 3, the number represented in Table 3 is a negative number or an imaginary number portion of a complex number, and it can be seen that the effective bit number of the number is 15 according to the above definition.

TABLE 3

| 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 |

Assumed that the data to be stored are shown in Table 4 below, wherein the data to be stored are hexadecimal complex numbers, and an effective bit number of a complex number is the lager value between an effective bit number of a real number portion of the complex number and an effective bit number of an imaginary number portion of the complex number.

TABLE 4

| Serial Number | Real Number Portion | Imaginary Number Portion |
|---|---|---|
| 1 | 0 × 12374911 | 0 × 84736297 |
| 2 | 0 × 2a645678 | 0 × 36064321 |
| 2 | 0 × 0bcf9789 | 0 × ff198736 |
| 4 | 0 × 00004321 | 0 × 03837291 |

After conversion to binary, the corresponding binary data are shown in Table 5:

TABLE 5

| Real Number Portion | Imaginary Number Portion |
|---|---|
| 10010001101110100100100010001 | 10000100011100110110001010010111 |
| 101010011001000101011001111000 | 110110000001100100001100100001 |
| 1011110011111001011110001001 | 11111111000110011000011100110110 |
| 100001100100001 | 1110000011011100101001001 |

According to the determination approaches as Tables 2 and 3, it can be obtained that the effective bit number of data 1 is 31, the effective bit number of data 2 is 30, the effective bit number of data 3 is 28, and the effective bit number of data 4 is 26.

As described in the above S102, the data are divided into blocks according to the preset number, and the effective bit number corresponding to each data in the block is determined, wherein the corresponding effective bit numbers are 31, 30, 28 and 26, and the value Em of the maximum effective bit number is equal to 31.

As described in the above S103, the data in the block are divided into a first sub-block and a second sub-block with an equal number, the acquired effective bit numbers contained in the first sub-block are 31 and 30, and the effective bit numbers contained in the second sub-block are 28 and 26.

According to the above approach for obtaining the effective bit differential value, the effective bit sub-block differential value between the first sub-block and the second sub-block is a differential value between the value of the maximum effective bit number in the first sub-block and the value of the maximum effective bit number in the second sub-block, that is, the effective bit sub-block differential value between the first sub-block and the second sub-block is Esd=28−31=−3.

The effective bit differential value of the first sub-block is a differential value of values of the effective bit numbers contained in the first sub-block, that is, the effective bit differential value of the first sub-block is Ead[0]=30−31=−1.

Correspondingly, the effective bit differential value of the second sub-block is Ead[1]=26−28=−2.

Alternatively, according to the value Em=31 of the maximum effective bit number, the storage bit widths for storing the effective bit sub-block differential value Esd=−3 between the first sub-block and the second sub-block, the effective bit differential value Ead[0]=−1 of the first sub-block and the effective bit differential value Ead[1]=−2 of the second sub-block are determined.

Herein, the value of the maximum effective bit number Em=31 after binarization is "11111", the storage bit width of the value Em=31 of the maximum effective bit number is 5 bits.

Since Em=31 belongs to the preset storage bit width interval [16, 31], the corresponding storage bit width for storing the effective bit sub-block differential value Esd=−3 between the first sub-block and the second sub-block is 6 bits.

Since Em=31 belongs to the preset storage bit width interval [16, 31], the corresponding storage bit width for storing the effective bit differential value Ead[0]=−1 of the first sub-block is 4 bits.

Similarly, the storage bit width for storing the effective bit differential value Ead[1]=−2 of the second sub-block is 4 bits. Finally, the data stored in the computer are shown in Table 6.

TABLE 6

| Em | Esd | Ead [0] | Ead [1] |
|---|---|---|---|
| 1 1 1 1 1 1 1 1 | 1 0 1 1 | 1 1 1 1 | 1 1 1 0 |

Figure 3:
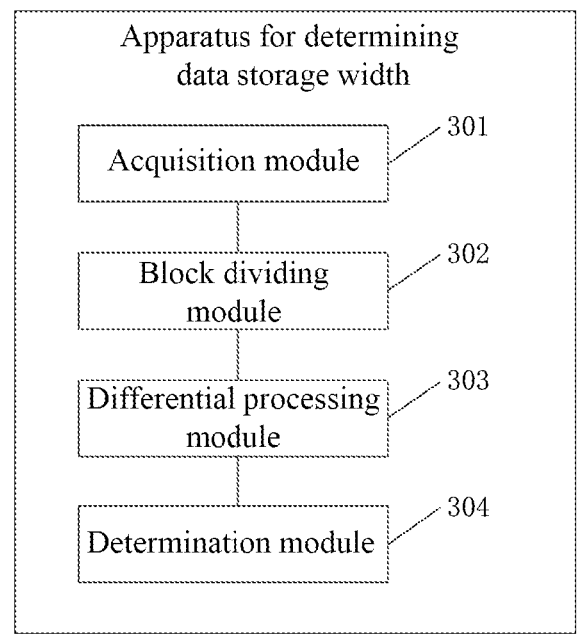
FIG. 3 is a schematic diagram of a structure of an apparatus for determining a data storage bit width provided by an embodiment of the present disclosure.

FIG. 3 is a schematic diagram of a structure of an apparatus for determining a data storage bit width provided by an embodiment of the present disclosure. As shown in FIG. 3, the apparatus includes an acquisition module 301, a block dividing module 302, a differential processing module 303, and a determination module 304.

The acquisition module 301 is configured to acquire data to be stored, wherein the number of the data is at least 4.

The block dividing module 302 is configured to divide the data into blocks according to a preset number, and determine an effective bit number corresponding to each data in a block and a value of a maximum effective bit number in the block, wherein the preset number is equal to $2^n$, and n is an integer greater than or equal to 2.

The block dividing module 302 is further configured to divide data in the block into a first sub-block and a second sub-block with an equal number, and acquire effective bit numbers contained in the first sub-block and effective bit numbers contained in the second sub-block.

The differential processing module 303 is configured to perform a differential calculation on the effective bit numbers contained in the first sub-block and the effective bit numbers contained in the second sub-block to obtain an effective differential value.

The determination module 304 is configured to determine a storage bit width for storing the effective differential value according to a preset storage bit width interval to which the value of the maximum effective bit number belongs.

In one possible implementation, the differential processing module 303 is specifically configured to: perform a differential calculation on the effective bit numbers contained in the first sub-block and the effective bit numbers contained in the second sub-block to obtain an effective bit sub-block differential value between the first sub-block and the second sub-block; perform a differential calculation on the effective bit numbers contained in the first sub-block to obtain an effective bit differential value of the first sub-block; and perform a differential calculation on the effective bit numbers contained in the second sub-block to obtain an effective bit differential value of the second sub-block.

In one possible implementation, the differential processing module 303 is specifically further configured to: acquire a value of a maximum effective bit number in the first sub-block and a value of a maximum effective bit number in the second sub-block; and perform a subtraction operation on the value of the maximum effective bit number in the first sub-block and the value of the maximum effective bit number in the second sub-block to obtain the effective bit sub-block differential value.

In one possible implementation, the differential processing module 303 is specifically further configured to: perform a subtraction operation on values of effective bit numbers contained in the first sub-block to obtain the effective bit differential value of the first sub-block.

In one possible implementation, the differential processing module 303 is specifically further configured to: perform a subtraction operation on values of effective bit numbers contained in the second sub-block to obtain the effective bit differential value of the second sub-block.

In one possible implementation, the determination module 304 is further configured to perform a binarization on the value of the maximum effective bit number to determine a storage bit width for storing the maximum effective bit number.

In one possible implementation, the determination module 304 is specifically further configured to determine a storage bit width for storing the effective bit sub-block differential value between the first sub-block and the second sub-block according to the preset storage bit width interval to which the value of the maximum effective bit number belongs; determine a storage bit width for storing the effective bit differential value of the first sub-block according to the preset storage bit width interval to which the value of the maximum effective bit number belongs; and determine a storage bit width for storing the effective bit differential value of the second sub-block according to a preset storage bit width interval to which the maximum effective bit number value belongs.

In one possible implementation, the determination module 304 is specifically further configured to when the data is a real number, determine that the effective bit number of the data is an effective bit number corresponding to the real number; or when the data is a complex number, determine that the effective bit number of the data is a maximum effective bit number of a real number portion and an imaginary number portion of the complex number.

The method for storing successive exponential data provided by an embodiment of the present disclosure is illustrated in detail below in connection with the data in Table 5.

First, when the data contains four successive exponential data, a differential storage operation may be performed on the four successive exponential data. For example, corresponding respective effective bit numbers 31, 30, 28, 26 thereof may be obtained based on the four successive exponential data in Table 5, and the obtained maximum effective bit number $Em_a$ of the four data is 31.

Then, the above-mentioned four data are equally divided into two sub-data blocks, that is, the effective bit numbers in the first sub-data block are 31, 30, and the effective bit numbers in the second sub-data block are 28, 26. Accordingly, the maximum effective bit number $Em_{a1}$ in the first sub-data block is 31, the maximum effective bit number $Em_{a2}$ in the second sub-data block is 28, and thereby the differential value $Esd_a$ of the maximum effective bit numbers in the two sub-data blocks may be obtained, which is equal to $Em_{a2}-Em_{a1}=28-31=-3$.

In an embodiment of the present disclosure, the data blocks and sub-data blocks are divided based on the successiveness of data distribution, that is, the data after being divided into blocks and the ordering of the data blocks are arranged according to the original data order, and a differential calculation or a subtraction operation is also performed according to the unified and certain order, the positive and negative signs of the differential values are reserved. For example, the high-ordered is subtracted from the low-ordered uniformly, or the low-ordered is subtracted from the high-ordered uniformly. The successive exponential data described in the present disclosure refers to adjacent exponential data sequentially arranged in one dimension, which may be, for example, sequentially arranged in a dimension of sampling time, or sequentially arranged in a dimension of storage space, etc. Since the data in the data block are successive exponential data, the effective bit numbers of other data in the data block may be determined by the effective bit number of one of the data and the differential values of the effective bit numbers.

Furthermore, the differential value $Ead_a$ of the effective bit numbers in each sub-data block is acquired; that is, for the first sub-data block, $Ead_{a11}$ is equal to 26−28=−2, and for the second sub-block, $Ead_{a12}$ is equal to 30−31=−1.

Finally, the maximum effective bit number $Em_a$, the effective bit sub-block differential value $Esd_a$, the effective bit differential value $Ead_{a11}$ and the effective bit differential value $Ead_{a12}$ are stored, that is, 31, −3, −2 and −1 are stored, which may achieve the storage of four successive exponential data in Table 5.

In addition, when the above storage operation is performed, the bit widths of the effective bit number $Em_a$, the effective bit sub-block differential value $Esd_a$, the effective bit differential value $Ead_{a1}$ and the effective bit differential value $Ead_{a2}$ each may be dynamically adjusted based on the size of the effective bit number $Em_a$ so as to achieve a dynamic storage of the data, specific contents of which may refer to the related contents of the above embodiments and will not be repeated here.

In another alternative embodiment, when eight successive data are contained in the exponential data, the eight successive data may be taken as one data unit, the maximum effective bit number $Em_b$ in the eight data may be first acquired at this time. Then the eight exponential data are equally divided into two data blocks each containing four successive data, and an effective bit block differential value $Esd_b$ of the maximum effective bit numbers in the two data blocks is acquired. After that, the effective bit sub-block differential value $Esd_a$ of sub-data blocks and the effective differential value $Ead_a$ of each sub-data block may be obtained based on the above data processing acts for the four data. Finally, the maximum effective bit number $Em_b$, the effective bit block differential value $Esd_b$, the effective bit sub-block differential value $Esd_a$ and the effective bit differential value $Ead_a$ are stored, thereby the storage of the eight data blocks can be achieved. Similarly, the storage operation may also refer to the above related contents for dynamic storage.

Since it is certain that the maximum effective bit number $Em_b$ is coincided with at least one of the maximum effective bit numbers $Em_a$ of two data blocks each containing four successive data, respectively, and the effective bit sub-block differential value $Esd_a$ is stored, when the eight successive data are stored, eight data only need to be stored, that is, the maximum effective bit number $Em_b$, the effective bit block differential value $Esd_b$, the effective bit sub-block differential value $Esd_{a1}$ of the first sub-block, the effective bit differential values $Ead_{a11}$ and $Ead_{a12}$ the two first sub-blocks, the effective bit sub-block differential value $Esd_{a1}$ of the second sub-block, and the effective bit differential values $Ead_{a21}$ and $Ead_{a22}$ of the two second sub-blocks.

In another alternative embodiment, for $4*2^x$ successive data (x is an integer greater than or equal to 1) containing such as 16, 32, 64, etc. data, one or more bisection processings may be performed on the $4*2^x$ successive data. For example, for 16 data, first the 16 data are equally divide into data blocks with 8 data in one group, and then storage is performed by adopting the technical contents related to the above embodiments; for 32 data, first the 32 data are equally divided into data blocks with 16 data in one group, then the data blocks with 16 data in each group are equally divide into data blocks with 8 data in one group, and after that, storage and the like are performed by adopting the technical contents related to the above embodiments.

In embodiments of the present disclosure, the concept that storage is performed on every four data in one group may be similarly applied to storage of every $4*2^x$ data (x is an integer greater than or equal to 1) in one group. For $4*2^x$ data in one group, first the maximum effective bit number of successive data in the one group is acquired, and then one or more bisection processings are performed on the $4*2^x$ data. A differential calculation is performed on data blocks after each bisection to obtain an effective bit block differential value $Esd_b$ of the maximum effective bit numbers between the data blocks of each bisection processing until the sub-data blocks containing four successive data are divided, and then the maximum effective bit number Em of the data, the effective bit block differential value $Esd_b$ of the maximum effective bit numbers between the data blocks obtained by each bisection processing, the corresponding effective bit sub-block differential value $Esd_a$ in sub-data blocks and the effective bit differential value $Ead_a$ in each sub-data block, which are $4*2^x$ related data in total, are stored, that is, the number of related data stored finally is the same as the number of the above successive data.

In some exemplary embodiments, performing one or more bisection processings on $4*2^x$ data includes: performing (2x−1) bisection processings on the $4*2^x$ successive data to divide the $4*2^x$ successive data into $2^x$ successive data blocks each including 4 data.

For example, when x is equal to 1, one bisection processing is performed on 8 successive data to divide the 8 successive data into 2 successive data blocks each including 4 data; when x is equal to 2, three bisection processings are performed on 16 successive data to divide the 16 successive data into 4 successive data blocks each including 4 data; when x is equal to 3, seven bisection processings are performed on 32 successive data to divide the 32 successive data into 8 successive data blocks each including 4 data; and when x is equal to 4, 5 or 6 . . . , a similar way will be adopted.

In some alternative embodiments, the successive exponential data may also be stored as a piece of differential data information based on actual requirements, or the successive exponential data may be divided into a plurality of different data units, each of which is stored as a piece of differential data information. For example, successive exponential data may be divided into y (y is an integer greater than 0) preset data units, differential calculation and/or storage operations in embodiments of the present disclosure may be performed synchronously or asynchronously on multiple data units. Alternatively, y may be determined according to the number of successive exponential data and the number of exponential data in each data unit, wherein the number of exponential data in each data unit may be $2^m$, and m may be an integer greater than or equal to 2.

When the successive exponential data are stored as a piece of differential data information, the storage space occupied by the exponential data storage may be reduced to the greatest extent. When the successive exponential data are divided into different data units for processing, since the differential processing in the embodiment of the present disclosure is performed independently on the differential data among the data units, that is, the stored differential data are independent of each other with no correlation, the data storage space can be reduced meanwhile the mutual influence between the stored data can be taken into account, so that the stability and safety of data storage can be improved.

Figure 4:
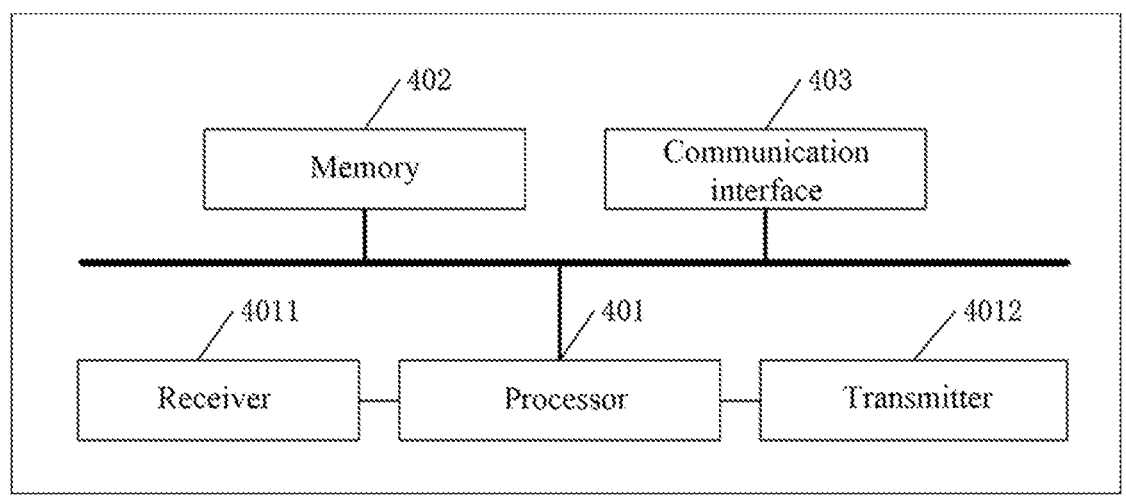
FIG. 4 is a schematic diagram of a structure of an electronic device provided by an embodiment of the present disclosure.

FIG. 4 is a schematic diagram of a structure of an electronic device provided by an embodiment of the present disclosure. The electronic device may be, for example, a device management network element or a terminal. As shown in FIG. 4, the electronic device may include a receiver 4011, a transmitter 4012, at least one processor 401 and a memory 402.

The above receiver 4011 and the transmitter 4012 are both coupled to the processor 401. The processor 401 controls a receiving action of the receiver 4011 and a sending action of the transmitter 4012.

The memory 402 is configured to store a program. In particular, the program may include program codes, which include computer operation instructions.

The memory 402 may include a high-speed RAM memory, or may include a non-volatile memory, such as at least one disk memory.

The processor 401 is configured to execute the computer-executable instructions stored in the memory 402 to implement the communication method described in the aforementioned method embodiments. Herein, the processor 401 may be a Central Processing Unit (CPU for short), or an Application Specific Integrated Circuit (ASIC for short), or one or more integrated circuits configured to implement embodiments of the present disclosure.

Alternatively, the electronic device 400 may also include a communication interface 403. In a particular implementation, if the communication interface 403, the memory 402 and the processor 401 are implemented independently, the communication interface 403, the memory 402 and the processor 401 may be connected to each other and communicate with each other through a bus. The bus may be an Industry Standard Architecture (ISA for short) bus, a Peripheral Component (PCI for short) bus, or an Extended Industry Standard Architecture (EISA for short) bus, and so on. The bus may be classified into an address bus, a data bus, a control bus, etc., but it does not mean that there is only one bus or one type of bus.

Alternatively, in a particular implementation, if the communication interface 403, the memory 402 and the processor 401 are integrated on a single chip, the communication interface 403, the memory 402 and the processor 401 may communication with each other through an internal interface.

An embodiment of the present disclosure further provides a computer-readable storage medium, which may include various media capable of storing program codes such as a U disk, a mobile hard disk, a read-only memory (ROM), a random access memory (RAM), a magnetic disk or an optical disk, etc. In particular, the computer-readable storage medium stores program instructions therein, which are used for implementing the methods in the above embodiments.

An Embodiment of the present disclosure further provides a program product including execution instructions stored in a readable storage medium. At least one processor of the electronic device may read the execution instructions from a readable storage medium, and the at least one processor executes the execution instructions to enable the electronic device to implement the methods provided by the above various embodiments.

Other embodiments of the present disclosure will readily occur to those skilled in the art after those skilled in the art consider the specification and practice the invention disclosed herein. Embodiments of the present disclosure are intended to contain any variations, uses, or adaptations of the present disclosure that follow the general principles of the present disclosure and include common knowledge or conventional techniques in the art that are not disclosed in the present disclosure. The specification and embodiments are considered to be exemplary only, and the scope and spirit of the present disclosure are determined by the following claims.

It should be understood that the present disclosure is not limited to the precise structures already described above and shown in the drawings, and various modifications and changes of the embodiments of the present disclosure may be made without departing from its scope. The scope of the present disclosure is defined only by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method for storing data, executed by a processor of a millimeter wave radar chip, the method comprising:
   acquiring data to be stored, wherein a number of the data is at least 4;
   dividing the data into blocks according to a preset number, and determining an effective bit number corresponding to each data in a block and a value of a maximum effective bit number in the block, wherein the preset number is equal to $2^n$, and n is an integer greater than or equal to 2;
   dividing data in the block into a first sub-block and a second sub-block with an equal number, and acquiring effective bit numbers contained in the first sub-block and effective bit numbers contained in the second sub-block;
   performing a differential calculation on the effective bit numbers contained in the first sub-block and the effective bit numbers contained in the second sub-block to obtain an effective differential value, wherein the effective differential value comprises an effective bit sub-block differential value between the first sub-block and the second sub-block, an effective bit differential value of the first sub-block, and an effective bit differential value of the second sub-block;
   dynamically adjusting storage bit widths for storing the effective bit sub-block differential value, the effective bit differential value of the first sub-block, and the effective bit differential value of the second sub-block according to the value of the maximum effective bit number, a preset storage bit width interval of the effective bit sub-block differential value, a preset storage bit width interval of the effective bit differential value of the first sub-block, and a preset storage bit width interval of the effective bit differential value of the second sub-block; wherein the preset storage bit width interval of the effective bit sub-block differential value, the preset storage bit width interval of the effective bit differential value of the first sub-block and the preset storage bit width interval of the effective bit differential value of the second sub-block are set by the processor of the millimeter wave radar chip in advance, and 1 bit in the effective bit sub-block differential value is reserved by the processor of the millimeter wave radar chip to indicate whether the value of the maximum effective bit number is from the first sub-block or the second sub-block; and storing the effective bit sub-block differential value, the effective bit differential value of the first sub-block, and the effective bit differential value of the second sub-block according to the storage bit widths.

2. The method according to claim 1, wherein the performing the differential calculation on the effective bit numbers contained in the first sub-block and the effective bit numbers contained in the second sub-block to obtain the effective bit differential value comprises:

performing a differential calculation on the effective bit numbers contained in the first sub-block and the effective bit numbers contained in the second sub-block to obtain the effective bit sub-block differential value between the first sub-block and the second sub-block;

performing a differential calculation on the effective bit numbers contained in the first sub-block to obtain the effective bit differential value of the first sub-block; and performing a differential calculation on the effective bit numbers contained in the second sub-block to obtain the effective bit differential value of the second sub-block.

3. The method according to claim 2, wherein the performing the differential calculation on the effective bit numbers contained in the first sub-block and the effective bit numbers contained in the second sub-block to obtain the effective bit sub-block differential value between the first sub-block and the second sub-block comprises:

acquiring a value of a maximum effective bit number in the first sub-block and a value of a maximum effective bit number in the second sub-block; and performing a subtraction operation on the value of the maximum effective bit number in the first sub-block and the value of the maximum effective bit number in the second sub-block to obtain the effective bit sub-block differential value.

4. The method according to claim 2, wherein the performing the differential calculation on the effective bit numbers contained in the first sub-block to obtain the effective bit differential value of the first sub-block comprises:

performing a subtraction operation on values of the effective bit numbers contained in the first sub-block to obtain the effective bit differential value of the first sub-block.

5. The method according to claim 2, wherein the performing the differential calculation on the effective bit numbers contained in the second sub-block to obtain the effective bit differential value of the second sub-block comprises:

performing a subtraction operation on values of the effective bit numbers contained in the second sub-block to obtain the effective bit differential value of the second sub-block.

6. The method according to claim 5, wherein before the dynamically adjusting the storage bit widths, the method further comprises:

performing a binarization on the value of the maximum effective bit number to determine a storage bit width for storing the maximum effective bit number.

7. The method according to claim 1, wherein the determining the effective bit number corresponding to each data in the each block comprises:

when the data is a real number, determining that the effective bit number of the data is an effective bit number corresponding to the real number; or when the data is a complex number, determining that the effective bit number of the data is a maximum effective bit number of a real number portion and an imaginary number portion of the complex number.

8. An electronic device containing a millimeter wave radar chip, comprising: at least one processor, a memory, a receiver and a transmitter;

wherein the receiver and the transmitter are both coupled to the at least one processor; the at least one processor controls a receiving action of the receiver, and the at least one processor controls a sending action of the transmitter;

the memory stores computer-executable instructions; and the at least one processor executes computer-executable instructions stored in the memory, to enable the electronic device to perform the method according to claim 1.

9. A non-transitory computer-readable storage medium having computer-executable instructions stored thereon, wherein when the computer-executable instructions is executed by a processor of a millimeter wave radar chip, the method according to claim 1 is performed.

10. A millimeter wave radar chip, comprising a processor, wherein the processor is configured to execute computer-executable instructions to perform the following acts:

acquiring data to be stored, wherein a number of the data is at least 4;

dividing the data into blocks according to a preset number, and determining an effective bit number corresponding to each data in a block and a value of a maximum effective bit number in the block, wherein the preset number is equal to $2^n$, and n is an integer greater than or equal to 2;

dividing data in the block into a first sub-block and a second sub-block with an equal number, and acquiring effective bit numbers contained in the first sub-block and effective bit numbers contained in the second sub-block;

performing a differential calculation on the effective bit numbers contained in the first sub-block and the effective bit numbers contained in the second sub-block to obtain an effective differential value, wherein the effective differential value comprises an effective bit sub-block differential value between the first sub-block and the second sub-block, an effective bit differential value of the first sub-block, and an effective bit differential value of the second sub-block;

dynamically adjusting storage bit widths for storing the effective value-bit sub-block differential value, the effective bit differential value of the first sub-block, and the effective bit differential value of the second sub-block according to the value of the maximum effective bit number, a preset storage bit width interval of the effective bit sub-block differential value, a preset storage bit width interval of the effective bit differential value of the first sub-block, and a preset storage bit width interval of the effective bit differential value of the second sub-block; wherein the preset storage bit width interval of the effective bit sub-block differential value, the preset storage bit width interval of the effective bit differential value of the first sub-block and the preset storage bit width interval of the effective bit differential value of the second sub-block are set by the processor of the millimeter wave radar chip in advance, and 1 bit in the effective bit sub-block differential value is reserved by the processor of the millimeter wave radar chip to indicate whether the value of the maximum effective bit number is from the first sub-block or the second sub-block; and storing the effective bit sub-block differential value, the effective bit differential value of the first sub-block, and the effective bit differential value of the second sub-block according to the storage bit widths.

11. The millimeter wave radar chip according to claim 10, wherein the processor is configured to perform the following acts:

performing a differential calculation on the effective bit numbers contained in the first sub-block and the effective bit numbers contained in the second sub-block to obtain the effective bit sub-block differential value between the first sub-block and the second sub-block;

performing a differential calculation on the effective bit numbers contained in the first sub-block to obtain the effective bit differential value of the first sub-block; and performing a differential calculation on the effective bit numbers contained in the second sub-block to obtain the effective bit differential value of the second sub-block.

12. The millimeter wave radar chip according to claim 10, wherein the processor is configured to, when the data is a real number, determine that the effective bit number of the data is an effective bit number corresponding to the real number; or when the data is a complex number, determine that the effective bit number of the data is a maximum effective bit number of a real number portion and an imaginary number portion of the complex number.

13. A method for storing exponential data, executed by a processor of a millimeter wave radar chip, the method comprising:

acquiring exponential data to be stored; wherein each data in the exponential data has a corresponding effective bit number;

acquiring a maximum effective bit number $Em_a$ in data for a data block containing four successive data in the exponential data, wherein successive data refer to adjacent data sequentially in a dimension of sampling time or a storage space;

dividing the data block into two data sub-blocks equally, and acquiring an effective bit sub-block differential value $Esd_a$ of maximum effective bit numbers of the two data sub-blocks;

acquiring an effective bit differential value $Ead_a$ of effective bit numbers in each data sub-block;

dynamically adjusting storage bit widths for storing the effective bit sub-block differential value, the effective bit differential values of the two data sub-blocks according to the value of the maximum effective bit number, a preset storage bit width interval of the effective bit sub-block differential value, preset storage bit width intervals of the effective bit differential values of the two data sub-blocks; wherein the preset storage bit width interval of the effective bit sub-block differential value, and the preset storage bit width intervals of the effective bit differential values of the two data sub-blocks are set by the processor of the millimeter wave radar chip in advance, and 1 bit in the effective bit sub-block differential value is reserved by the processor of the millimeter wave radar chip to indicate the value of the maximum effective bit number is from which data sub-block of the two data sub-blocks; and storing the maximum effective bit number $Em_a$, the effective bit sub-block differential value $Esd_a$, and each effective bit differential value $Ead_a$ according to the storage bit widths, to achieve storage of the data block.

14. The method according to claim 13, wherein when $4*2^x$ successive data are contained in the exponential data, x being an integer greater than or equal to 1, the method further comprises:

performing one or more bisection processings on the $4*2^x$ successive data to divide the $4*2^x$ successive data into a plurality of successive data blocks comprising a preset number of data;

acquiring a maximum effective bit number Em in the successive $4*2^x$ data, an effective bit block differential value $Esd_b$ of maximum effective bit numbers of data blocks in each bisection processing, an effective bit sub-block differential value $Esd_a$ of data sub-blocks, and an effective bit differential value $Ead_a$ of each data sub-block;

storing the maximum effective bit number Em in the successive $4*2^x$ data, the effective bit block differential value $Esd_b$ of maximum effective bit numbers of data blocks in each bisection processing, the effective bit sub-block differential value $Esd_a$ of data sub-blocks, and the effective bit differential value Eada of each data sub-block, to achieve storage of the $4*2^x$ exponential data;

wherein a total number of stored data is $4*2^x$.

15. The method according to claim 14, wherein the performing one or more bisection processings on the $4*2^x$ successive data to divide the $4*2^x$ successive data into plurality of successive data blocks comprising the preset number of data comprises:

performing (2x−1) bisection processings on the $4*2^x$ successive data to divide the $4*2^x$ successive data into $2^x$ successive data blocks comprising respective 4 data.

16. The method according to claim 14, further comprising:

dividing the exponential data into a plurality of data units, each of which comprises $4*2^x$ successive data, and for the $4*2^x$ successive data of each of the data units, triggering an act of performing one or more bisection processings on the $4*2^x$ successive data, respectively.

17. The method according claim 13, wherein when the exponential data contains eight successive data, the method further comprises:

acquiring a maximum effective bit number $Em_b$ in the eight data;

dividing the exponential data into two data blocks equally, and acquiring an effective bit block differential value $Esd_b$ of maximum effective bit numbers in the two data blocks;

acquiring two effective bit sub-block differential values $Esd_a$ of data sub-blocks and an effective bit differential value $Ead_a$ of each data sub-block; and storing the maximum effective bit number $Em_b$, the effective bit block differential value $Esd_b$, the two effective bit sub-block differential values $Esd_a$ and each effective bit differential value $Ead_a$, to achieve storage of the eight data.

18. An electronic device containing a millimeter wave radar chip, comprising: at least one processor, a memory, a receiver and a transmitter;

wherein the receiver and the transmitter are both coupled to the at least one processor; the at least one processor controls a receiving action of the receiver, and the at least one processor controls a sending action of the transmitter;

the memory stores computer-executing instructions; and the at least one processor executes computer-executable instructions stored in the memory, to enable the electronic device to perform the method according to claim 13.

19. A non-transitory computer-readable storage medium having computer-executable instructions stored thereon, wherein when the computer-executable instructions is executed by a processor of a millimeter wave radar chip, the method according to claim 13 is performed.

\* \* \* \* \*